United States Patent [19]
Freeman et al.

[11] 3,858,170
[45] Dec. 31, 1974

[54] VIBRATOR PERFORMANCE MONITOR

[75] Inventors: Francis R. Freeman; Joseph F. Metrailer, both of Tulsa, Okla.

[73] Assignee: Amoco Production Company, Tulsa, Okla.

[22] Filed: Oct. 23, 1973

[21] Appl. No.: 408,355

[52] U.S. Cl. .................. 340/16 C, 340/17, 324/8 R
[51] Int. Cl. .............................................. G01v 1/14
[58] Field of Search...340/16 C, 16 ST, 17, 15.5 TC; 73/DIG. 6; 181/15 RD, 15 H; 324/83 R, 83 FE

[56] References Cited
UNITED STATES PATENTS
3,516,510 6/1970 Coburn et al...................... 181/.5 H
3,578,102 5/1971 Ross et al..................... 340/15.5 TC Primary Examiner—Maynard R. Wilbur
Assistant Examiner—N. Moskowitz
Attorney, Agent, or Firm—John B. Farr; Paul F. Hawley

[57] ABSTRACT

In geophysical prospecting where a number of earth vibrators are simultaneously used to inject predetermined seismic wave trains into the earth, electrical and mechanical malfunctions cause the vibrators to loose synchronization so that destructive interference occurs between the injected signals seriously degrading the seismic information. This problem is solved by monitoring each vibrator's injected signal and producing audio-visual warnings to the equipment operators when injected signals differ from the predetermined seismic wave train signal by an amount and in a manner indicative of faulty vibrator performance. The warnings are produced at two levels of faulty vibrator operation. At the first, or low level, the vibrator operator can take remedial action while the vibrator continues in operation. At the second, or high level, continued operation of the faulty vibrator will seriously affect the seismic data quality and therefore the operator stops his vibrator and removes it for repair. At the option of the operator, an automatic vibrator cut-off circuit is actuated which prevents continued vibrator operation when a serious fault is detected.

20 Claims, 5 Drawing Figures

VIBRATOR PERFORMANCE MONITOR

BACKGROUND OF THE INVENTION

This invention relates to seismic prospecting using vibratory signals and more particularly to a method and apparatus for monitoring the performance of a number of mechanical vibrators which are simultaneously employed to generate the vibratory signals.

The general method of seismic prospecting using vibratory signals is well-known. Briefly stated, the method consists of the steps of injecting a vibratory elastic wave signal into the earth at a first surface point, amplifying and reproducibly recording electrical signals generated by seismic wave detectors at other separated points on the earth's surface which arise from the reflection and refraction of the injected waves by elastic discontinuities during their transmission through the earth, cross-correlating the injected vibratory signal with each of the seismic detector signals to produce a number of different trace correlation curves, and measuring the time phase relationships on the different trace correlation curves to provide the time elapsing between signal injection and the subsequent reflected and refracted wave arrivals from the elastic discontinuities.

Due to the relatively low elastic wave energy produced by mechanical vibrators, as well as to cancel a portion of the noise generated by their use, it is customary to employ simultaneously several vibrators deployed in a pattern on the earth's surface to inject each signal and then subsequently to composite the individual recordings obtained from a number of adjacent patterns. Typically, four vibrators will simultaneously generate signals in a pattern and 20 or more such patterns will be used to produce signals which are composited to form a single vibrator point recording. Simultaneous use of several vibrators require synchronization so that the individual signals will reinforce. If, during any one injection cycle, the vibrators are not synchronized, destructive cancellation degrades the received signals producing noisy correlation curves on which the desired reflection signals are obscured.

The present invention is a novel monitoring system which continuously checks vibrator synchronization during the seismic data acquisition operations and automatically indicates to each vibrator operator when his vibrator is faulty and, if desired, shuts down a seriously faulty vibrator, thereby maintaining high quality seismic data recordings.

PRIOR ART

Various aspects of the method of seismic prospecting using vibratory signals are described in U.S. Pats. No. 2,808,577; No. 2,981,928; and No. 2,989,726, all by J. M. Crawford and W. E. N. Doty. It is essential in this type of prospecting that the earth vibrators be operated at a controlled variable frequency pattern in synchronism with a known reference or drive signal. Due to the inherent limitations of the mechanical vibrating apparatus, as well as variations in the mechanical and electrical control circuits, the injected seismic signal will now be precisely synchronized with the reference, or driving, signal. This loss in synchronism results from frequency dependent phase shifts introduced not only by the vibrator unit itself, but also by the type of soil or ground upon which it is operated. Therefore, the injected seismic signals vary as a function of time and position.

An apparatus for correcting this problem is shown by W. E. N. Doty in U.S. Pat. No. 3,208,545. Doty's apparatus employs a phase comparator to produce an error signal when the injected and driving signals differ. This error signal controls a phase shifter which adjusts the vibrator driving signal until the injected signal is in-phase with the driving signal. The major difficulty in the Doty system results from the dissimilarity of the approximately sinusoidal driving signal on one hand and the relatively noisy injected signal on the other hand. The injected signal contains large harmonics generated by the vibrator itself, in addition to a high level of noise from the vibrator machinery. This high level of noise on one of the two signals being compared prevented phase locking in all but the most favorable areas.

Cole, in U.S. Pat. No. 3,219,971, added an integrator to attenuate these detrimental injected signal noises and improved the phase lock circuitry so that the driving and injected signals would remain phase locked over a portion of the seismic frequency band.

Landrum, in U.S. Pat. No. 3,698,508, further improved the phase lock circuitry by addition of a tracking filter which by better harmonic attenuation improved the injected signal and the subsequent phase comparison, thereby extending the phase locking ability to lower frequencies in the driving signal.

Despite the above prior art phase locking circuits, periodic changes in mechanical vibrator characteristics and electronic circuit performance cause individual vibrators to inject seismic signals which vary from day-to-day and position-to-position when compared with a constant drive signal. Even when all vibrators and their associated phase locking electronic circuits remain in perfect working order, the requisite synchronization between vibrators is only maintained so long as all vibrators receive identical driving signals.

The driving signal is conventionally prerecorded on magnetic tape and stored in the recording apparatus. Since the individual vibrators are moving from point-to-point at some distance from the recording apparatus, the driving signal is normally transmitted to the vibrators over a radio link each time a new signal is required. Random interference, changes in radio transmision equipment, and terrain variations which affect the radio transmission paths combine to cause variations in the driving signal received by each vibrator with the result that the essential synchronization is lost. To eliminate this problem, a variety of coded pulse multiple frequency transmission systems have been proposed, typical of which is the system shown in U.S. Pat. No. 3,465,286 by Stone. Coded pulse systems have helped but have not solved the basic distortion problem.

To combat the signal distortion introduced by the radio link, vibrators have recently been equipped with identical self-contained signal generators which are used to produce the driving signal. The signal generators in the separate vibrator trucks and a similar unit located in the recording apparatus are synchronized upon receipt of a single radio pulse or by receipt of a common clock pulse over a wireline prior to the signal injection procedure. Systems using multiple generators are described by Pelton and Mitchell in U.S. Pats. No. 3,733,584 and No. 3,739,870. By using a special signal to synchronize the separate independent signal generators, the radio distortion of the driving signal is eliminated. So long as the separate driving signal generators, phase-lock circuits and vibrator mechanisms continue to perform in an identical manner, the injected seismic signals will be the same. Unfortunately, the continual vibration and dirt which accompany earth-vibrator operations combine to cause frequent component failures. Since multiple vibrators are employed, failure of a single unit is often undetected, particularly where the failure only involves a change in phase or amplitude between the injected and driving signals.

Although the prior-art improvements in individual phase control circuits, radio-transmission circuits and driving-signal generation circuits have upgraded the performance of the separate portions of the vibrator-control system, the overall reliability remains low. It is not uncommon to find when sporadic adjacent vibrator tests are made that one or more vibrators will be injecting signals with large phase shifts or irregular amplitude distortions.

The seismic data produced by use of such vibrators is of inferior quality. Since the received seismic data are not generally available for inspection in the field, it is only after the subsequent cross-correlation process is performed several days later at a remote data processing center that vibrator trouble can be identified. Even then, it is difficult to pinpoint the vibrator control system as the cause of poor seismic records, since local terrain conditions can give rise to the same results.

Current practice involves taking periodic vibrator similarity tests where all earth vibrators are brought together and their phase and amplitude response checked with special test instruments. Since they are made at the expense of data-acquisition operations, such similarity tests are only conducted at relatively long time intervals. Typically, a week or at least several days may elapse between such tests. At a maximum, the tests are only conducted on a daily basis. Between such tests, if a vibrator fails to inject the proper signal, this failure will not normally be detected until the next test, resulting in many miles of seismic coverage which is of substandard quality. If the vibrator distortion is of sufficient magnitude, the entire data acquisition sequence must be repeated at great expense.

SUMMARY OF THE INVENTION

The present invention is a method and apparatus for monitoring vibrator performance on a continuous basis while actual seismic data is being acquired. It provides a first audio-visual warning signal to each vibrator operator when his vibrator injects a seismic signal, which deviates from the predetermined driving signal by an amount which has previously been determined to be indicative of faulty performance. When so warned, the vibrator operator can quickly make minor adjustments or perform minor repairs to his equipment to reestablish the required synchronization between injected and driving signals while field operations continue.

A second audio-visual warning is produced when the driving and injected signals differ by a greater degree than the first warning. This second warning is activated only when a major failure occurs, and continued operation of the vibrator will seriously impair the recorded seismic data. When this second warning is received, the operator will cease operations and the data acquisition process continues with the remaining vibrators.

These two warnings may also be sent to the recording apparatus operator who can then delete recordings made during faulty vibrator injection cycles and call for additional injection cycles when one vibrator is not operating.

Provisions are made for recording on the seismic data tapes either the warning signals or the actual monitor signals for later identification of portions of the seismic line where faulty vibrator operation has occurred, so as to distinguish this cause of inferior record quality from other geological causes.

It is an object of this invention to provide a method and apparatus for maintaining optimum seismic data quality by continuously monitoring individual vibrator performance to alert field personnel when incipient minor difficulties arise which can be corrected during continued field operations.

It is another object of this invention to provide a signal to field personnel when individual vibrator performance has fallen to such a level that continued operation will seriously degrade further seismic data acquisition. Upon receipt of this second signal, the faulty vibrator can be removed and the field procedure immediately adjusted so that the remaining vibrators can compensate for the missing vibrator until it is repaired.

A further object of this invention is to provide a signal to the recording equipment operator when an individual vibrator malfunctions so he can delete any seismic data taken during the period of faulty operation, and can immediately go back and re-acquire this data before the field equipment has moved an appreciable distance from the site.

A still further object of this invention is to provide an indication on the seismic data recordings themselves when faulty vibrator operation has occurred, so as to permit subsequent identification of the causes of poor record quality. Many additional objects and advantages of the present invention will be evident from the following detailed description and drawings.

DETAILED DESCRIPTION OF THE PREFERRED EMBODIMENT

The present invention contemplates a multi-level monitoring system where vibrator performance is first monitored within each individual vibrator unit, then, between vibrator units, and, finally, in relation to the recorded seismic data, where subsequent computer analysis can be performed.

The multiple-vibrator signal-injection method, as currently practiced throughout the geophysical prospecting industry, requires synchronization be maintained between individual vibrators and a common driving signal source. The driving signal, also known as the counterpart or pilot signal, is subsequently used in a cross-correlation process to extract the desired reflection and refraction signals. This process is normally performed using a digital computer at a central location, far removed from the site of actual data acquisition operations. For this reason, actual records of the field data are not routinely available to field personnel while operations are underway.

In some instances, special cross-correlation apparatus has been added to the normal recording equipment strictly for monitoring purposes in an attempt to improve the quality of the seismic data acquired. These special monitors have only a limited correlation ability and are incapable of providing records of the quality achieved by use of a large computer center.

The vibratory prospecting method, while fast and economical, is particularly subject to data quality "erosion." This is due to the fact that the cross-correlation operation also filters the data, thereby masking indications of equipment failure. Also, since several vibrators are simultaneously injecting seismic signals, a distortion introduced by a single unit may be masked by the signals radiated by the remaining units. This masking phenomenon, coupled with the tendency of the complicated vibrator mechanisms to fail in a gradual rather than abrupt manner, has resulted in less than optimum data in a large number of geophysical prospect areas.

The present monitoring system avoids the delays inherent in subsequent cross-correlation operations by utilizing the driving signal directly. The normal changes in received data due to reflection and refraction processes are also eliminated by using as a monitor signal the seismic signals radiated into the earth before reflection or refraction has occurred. By using separate monitors for each vibrator, the masking action of the simultaneous injection from several sources is circumvented.

Figure 1:
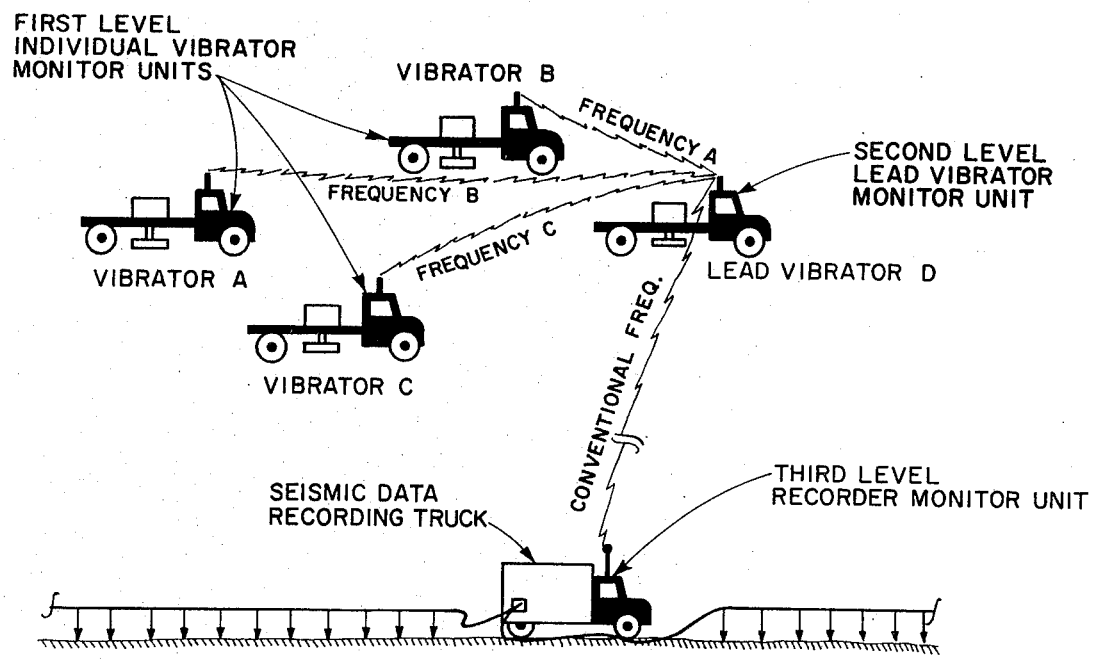
FIG. 1 is a diagrammatic view of the three level monitor system in operation.

As illustrated in FIG. 1, the preferred embodiment of my invention consists of three basic monitor units which typically would be located in different vehicles employed in the field operations. These units are normally interconnected by means of separate radio links between the vehicles.

Each of the three units provide different levels of monitoring. The first level unit is designed for use within individual vibrator trucks and only alerts the operator of that particular vibrator to a malfunction of his own equipment. The second level unit is used for monitoring an entire array of simultaneously operating vibrators at a central control location, which may be within one of the vibrators designated as a lead vibrator or at the recording apparatus location where the received seismic data is amplified and reproducibly recorded on magnetic tape. The third level unit, which is located at the recording apparatus position, extends the above two monitoring functions by reproducibly recording the monitor signals in conjunction with the conventional seismic data.

Here it should be understood that the first unit can be used to produce a minimum level of monitoring without units 2 and 3. Likewise, units 1 and 2 can be used alone without unit 3 to provide an intermediate level of monitoring. Finally, all three units can be used together to provide the maximum monitoring capability.

Figure 2:
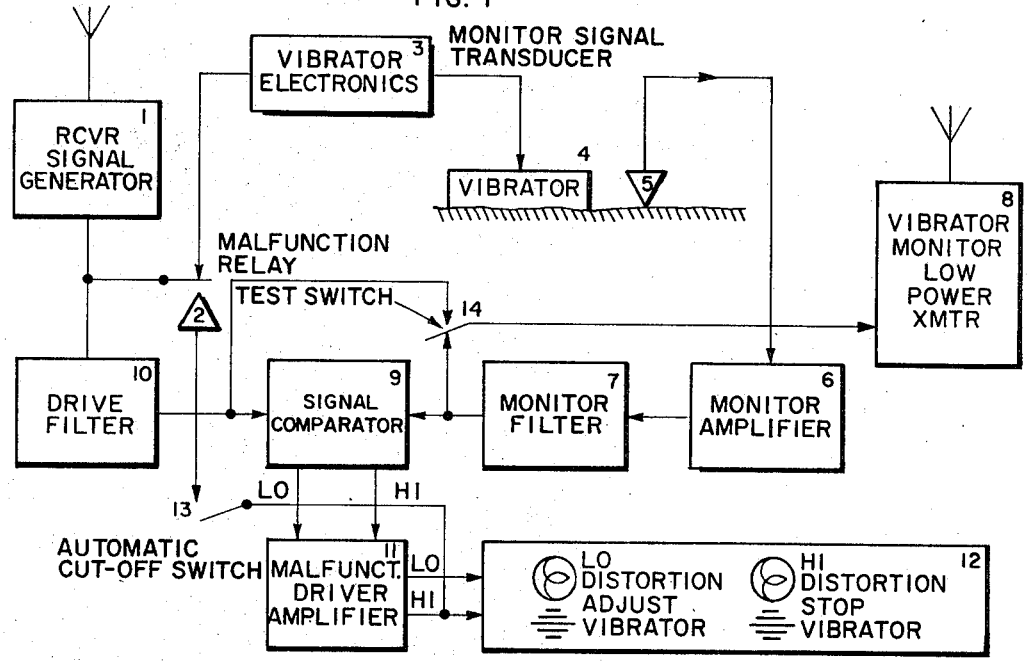
FIG. 2 is a schematic drawing of the basic monitor circuit used within each individual vibrator truck.

Attention is now directed to FIG. 2, where a first level individual vibrator monitor is schematically illustrated. Receiver signal generator 1 produces the electrical vibrator drive signal. This unit may be a conventional radio receiver which demodulates a radio signal from the recording apparatus containing the driving signal or may be a selfcontained signal generator which is triggered or synchronized by means of radio pulses, as discussed above. It should be understood that while radio links are normally used to interconnect the three level units, wirelines could be substituted where operating conditions permit. Radio links are preferable when vibrators are mounted on trucks which are in almost constant motion across the earth's surface.

Radio frequencies required to provide long-range reliable communication in difficult terrain are at a premium in the geophysical prospecting industry. A number of different field crews are required to share a given frequency, which results in high levels of noise and interference. Since verbal communications between field units must be accomplished over the same channel used for data transmission, it is most desirable to reduce the data transmission time to a minimum. In a typical vibrator operation, the drive signal is required for over 50 percent of the time and, consequently, the radio channel is unavailable during this period. Local signal generators require only a short synchronization period and then proceed to produce a noise-free, low-distortion drive signal without tying up the available radio channel.

As shown in FIG. 2, the electrical drive signal produced by radio signal generator 1 passes through malfunction relay 2, which is normally closed, to vibrator electronics 3. The vibrator electronics 3 contains the conventional phase control circuits, discussed above, and the necessary electromechanical valve to cause vibrator 4 to operate in accordance with the electrical drive signal. Vibrator 4 injects a seismic signal into the earth, which is detected by transducer 5 located in close proximity to the vibrator base plate. Transducer 5 may be a special moving coil seismometer, suitably ruggedized to withstand the large displacements encountered next to the vibrator. In many areas it has been found that mounting the seismometer on the vibrator base plate itself produces a signal very similar to the one detected a short distance away from the vibrator on the ground. As an alternative to the seismometer, a strain gauge could be attached to a driven member of the vibrators so as to produce a signal representative of the injected seismic signal.

The electrical signal from transducer 5 is directed to monitor amplifier 6, where it is amplified to a level approximately the same as the original drive signal from receiver generator 1. This amplifier is chosen to have essentially no phase or amplitude distortion across the frequency band encompassing the drive signal frequencies. The amplified electrical signal from monitor amplifier 6 then passes through monitor filter 7, which may be a simple high-cut filter to reduce noise, or a band-pass filter chosen to pass essentially only the frequencies contained in the original drive signal. Alternatively, it can be a tracking filter where the narrow passband is electrically controlled by receiver signal generator 1 to pass only the instantaneous frequency being injected into the earth. The tracking filter is used to insure that only the fundamental driving frequency at any given time is passed while harmonics of that driving frequency are severely attenuated. The choice of which type of filter best satisfies the requirements for monitor filter 7 is determined by the noise and harmonics present in the given prospect area.

The output of monitor filter 7 is directed to vibrator monitor transmitter 8 through test switch 14 and to signal comparator 9. Vibrator monitor transmitter 8 is typically a low-powered transmitter operating in the citizen's or other unrestricted general use band. This transmitter is only used to send the monitor signal a few hundred feet, generally along a line-of-sight path between the vibrators. It operates on an individual frequency separated from the conventional band used for communications and transmission of the synchronization pulse to receiver signal generator 1.

Drive filter 10 is connected to receiver signal generator 1 and is used to filter the drive signal in the same manner as the monitor signal was filtered by monitor filter 7. Since the drive signal is free from harmonics and noise, the sole purpose of drive filter 10 is to introduce identical amplitude changes and phase shifts on both drive and monitor signals so that they will effectively cancel out when compared. The output from drive filter 10 is directed to one input of signal comparator 9, while the output from monitor filter 7 is connected to the other input. Signal comparator 9 measures the phase shift and amplitude ratio between the drive and monitor signals input from drive filter 10 and monitor filter 7. It produces a first malfunction signal when the two signals differ by a first predetermined amount. Either phase deviation, amplitude differences, phase or amplitude variations, or phase and amplitude variations can be manually selected to produce this first malfunction signal. The magnitude of the variance needed to produce the first low-level malfunction signal is manually adjusted within the comparator in accordance with predetermined levels indicative of minor vibrator deviations. The low-level malfunction signal is produced when vibrator performance has deteriorated to a point where remedial action is required by the vibrator operator, but not to the point where seismic data is seriously degraded. The low-level malfunction signal output from signal comparator 9 is directed through malfunction driver amplifier 11 to audio-visual indicator 12, where it lights the low-level distortion light and causes an audio signal generator to emit a first audio warning signal to alert the operator when his attention is directed elsewhere.

When the monitor and drive signal differ in phase and/or amplitude by a predetermined greater amount, signal comparator 9 produces a second malfunction signal, which is directed through malfunction drive amplifier 11 to audio-visual indicator 12, where it lights the high-level distortion lamp and causes the audio signal generator to emit a second audio frequency warning signal to alert the operator. The second malfunction signal is only produced by signal comparator 9 when the phase and/or amplitude differences are so severe as to make continued operation of the vibrator inadvisable. The level of injected signal distortion necessary to trigger the second malfunction indicators is predetermined by tests performed prior to the survey and corresponds to a distortion level which would seriously degrade the seismic data. The high-level malfunction signal output from malfunction driver amplifier 11 may also be connected through automatic vibrator cut-off switch 13 to malfunction relay 2. When switch 13 is closed the driving signal to the vibrator will be cut off by malfunction relay 2 when a serious malfunction is detected. Malfunction relay 2 either is a time-delay relay or has provision for manual reset. Test switch 14 normally connects vibrator monitor transmitter 8 to monitor filter 7, however, when comparisons of signal generator performance are described it can be thrown to the other position connecting drive filter 10 to transmitter 8.

The two distortion levels at which the first and second malfunction signals are produced are manually adjustable within signal comparator 9. Normally, these adjustments are made during the initial test program conducted in each geophysical prospect area before the seismic data gathering operations get underway.

In the first level unit shown in FIG. 2 the malfunction signals are produced only when a phase and amplitude variation exists between the local vibrator drive signal and the corresponding local injected signal. This first level unit cannot detect variations between separate individual vibrator signals which can also impair the seismic data quality.

Figure 3:
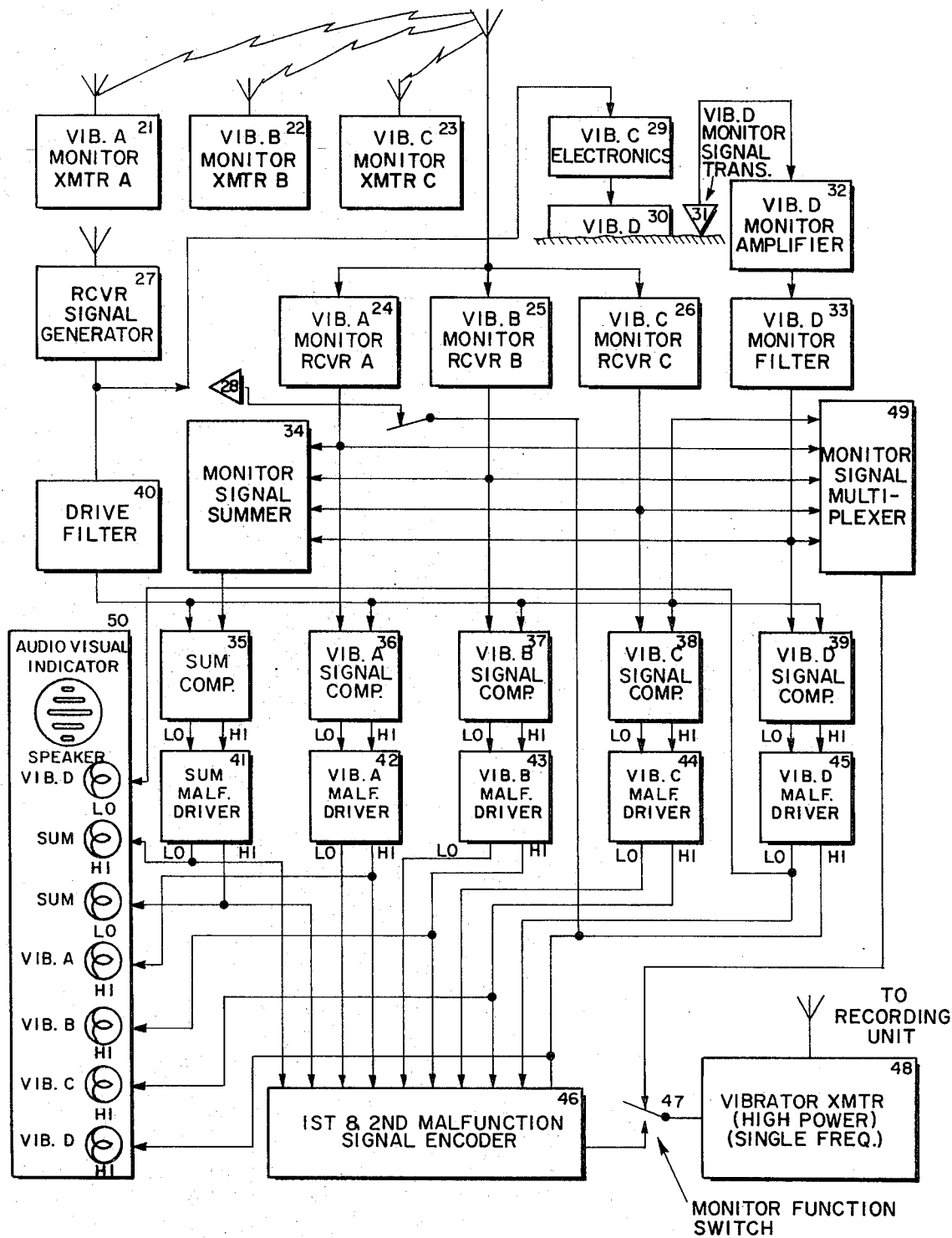
FIG. 3 is a schematic diagram of an expanded monitor system where monitoring is performed between individual trucks at a central control location.

FIG. 3 is a schematic diagram of the second level unit used to monitor the signals injected into the ground by all vibrators simultaneously. In conventional operations the vibrators are operated in a pattern with separations of from 50 to 500 feet between individual units. This separation is sufficient to isolate the separate injected signal transducers. However, it is close enough to permit use of low-powered radio links operating on separate frequencies in an unrestricted band for transmission of the monitor signals from each individual vibrator to a master or lead vibrator. FIG. 3 shows three such low-powered monitor transmitters, 21, 22, 23, which are located within each of three individual vibrators, A, B, and C. Vibrator monitor transmitter 8, shown in FIG. 2, corresponds to one of these units. The fourth or lead vibrator D in this 4-vibrator pattern contains the second monitor unit which consists of the remaining portion of FIG. 3.

Vibrator monitor receivers, 25, 25, and 26, demodulate the three separate monitor signals from the three remote vibrators, A, B, and C. The local receiver signal generator unit 27 located in vibrator D is the same as the receiver signal generator units (1 in FIG. 2) in each of the remaining vibrators. Although each receiver signal generator unit is designed to produce an identical vibrator driving signal, one of the prime functions of the second level monitor unit is to verify the synchronization and stability of these separate signal generator units.

The drive signal from receiver signal generator 27 passes through normally closed malfunction relay 28 to vibrator electronics 29 where it controls the seismic signals generated by vibrator 30 in the same manner as in the individual vibrator unit illustrated in FIG. 2. Vibrator monitor signal transducer 31 detects the injected seismic signal producing a corresponding electrical monitor signal which is amplified by monitor amplifier 32 and filtered in monitor filter 33 just as in the unit illustrated in FIG. 2. Monitor amplifier 32 is adjusted such that the output from monitor filter 33 is ordinarily essentially identical to the outputs of monitor receivers 24, 25, and 26. The four monitor signals from each of the four vibrators from the three monitor receivers, 24, 25, and 26, and the local monitor filter 33 are first directed to monitor signal summer 34 where they are composited to form a single sum signal representative of the total signal injected into the earth by all four vibrators operating simultaneously. Monitor signal summer 34 contains a normalizing output circuit which reduces the amplitude of the summed signal in proportion to the number of inputs. In this example, since four vibrators constitute a pattern, this normalizing output circuit would divide the summed amplitude by 4. The composited signal from monitor signal summer 34 is then directed to one input of sum comparator 35. The drive signal from receiver signal generator 27 is passed through drive filter 40 to compensate for the phase and amplitude distortions previously introduced by the individual unit monitor filters (7 in FIG. 2) and monitor filter 33 and then it is directed to the remaining input of sum comparator 35.

Monitor signals from the three monitor receivers, 24, 25, and 26, and monitor filter 33 are, respectively, directed to monitor input of signal comparators 36–39, which are essentially duplicates of the sum comparator 35. The filtered drive signal from drive filter 40 is also fed to the drive signal inputs of signal comparators 36–39. The signal comparators operate in the same manner as the single signal comparator 7, shown in FIG. 2. Each produces a low- and high-level malfunction signal, depending on the degree of phase and/or amplitude variation between the respective monitor signals and the local drive signal produced by receiver signal generator 27. The malfunction signals produced by signal comparators 35–39 are, respectively, amplified by drive amplifiers 41–45. Each high- and low-level malfunction signal from drive amplifiers 41–45 is then directed to first and second malfunction signal encoder 46, where each signal is encoded to provide a single input through monitor function switch 47 to a relatively high-power vibrator transmitter 48. Since a small number of signals must be sent over the single long-range transmitter frequency, a simple audio tone encoding system is entirely adequate. Other simple encoding methods well-known in the art can be used to transmit the malfunction signals.

For more detailed analysis it is sometimes desirable to transmit the actual monitor or driving signals themselves. This is accomplished by directly multiplexing the four vibrator monitor signals from monitor receivers 24, 25, 26, and monitor filter 33 in monitor signal multiplexer 49. By changing monitor function switch 47, it is possible to use vibrator transmitter 49 to send these signals in multiplexed form from monitor signal multiplexer 49 to the remote recording apparatus where they may be recorded along with the seismic data.

Here it should be noted that the system as outlined is predicated on the use of local signal generators requiring a single synchronizing pulse preceding the signal injection sequence. Under these circumstances the single radio channel can subsequently be utilized for transmission of the monitor or malfunction signals. When the drive signal is directly transmitted to each vibrator, the radio channel is unavailable during the injection cycle. Under these circumstances a second radio frequency channel is required or some type of memory must be inserted between monitor function switch 47 and vibrator transmitter 48 to delay the monitor or malfunction signals until the injection cycle is completed and the radio channel available.

Audio visual indicator 50 alerts the lead vibrator operator to the various high- and low-level malfunction signals from malfunction driver-amplifier 45 for his own vibrator and from the sum malfunction driver amplifier 41 for the composite summed signal. Just as in the individual monitor units, the high-level malfunction signal can be used to open the malfunction relay 28 when switch 51 is closed, thereby preventing further signal generation by vibrator 30. The lead vibrator operator can adjust his own vibrator when the low-level malfunction lamp lights and the corresponding audio alert signal is heard.

Only the high-level malfunction output from the remote vibrator malfunction driver amplifiers, 42, 43, 44, are connected to audio-visual indicator 50, since it is assumed that the other vibrator operators will correct their own low-level malfunctions as they occur.

When a remote vibrator high-level malfunction occurs, the lead vibrator operator can quickly determine the effect on the composite signal as indicated by the summed signal high- and low-level malfunction lights. If the summed signal degradation is not serious, the remote vibrator operator may be directed to remove his vibrator from the pattern for repairs and the generation sequence modified to restore the necessary power. If a serious summed signal degradation occurs, the lead vibrator operator may direct all operations be shut down until suitable repairs are made.

Since each monitor signal is being compared with the single drive signal from receiver signal generator 27, any variation between signal generators or differences in the radio transmission links will be detected by the lead vibrator operator.

The first and second units shown in FIGS. 2 and 3 can be used alone as an intermediate type of monitoring system. Under these circumstances, first and second malfunction signal encoder 46, monitor function switch 47, monitor signal multiplexer 49 and high-powered vibrator transmitter 48 could be eliminated from the circuit. This intermediate level monitoring system provides continual checks on vibrator performance but does not allow any subsequent evaluation of seismic data degradation or modification of seismic data recorded during a period when a vibrator is malfunctioning. These procedures are accomplished by use of a third monitoring unit, schematically illustrated in FIG. 4. This third unit is located in the recording truck where the seismic data signals are amplified, summed, and reproducibly recorded on magnetic tape.

The seismic signals produced by each vibrator pattern injection cycle are summed on a tape loop. Only when a prescribed number of signals from a sequence of multiple vibrator patterns have been summed is the result transferred to the reproducible magnetic tape. Many summer systems have a provision where the most recently recorded signal can be deleted from the sum at the option of the recording equipment operator. This provision permits the operator to elminate those seismic signals which have been produced during periods of faulty vibrator operation, which may degrade the overall quality of the summed recording. Some personal discretion may be exercised in this deletion by the recorder operator when individual vibrators produce a high-level malfunction signal but the summed signal remains satisfactory or undergoes only a low-level distortion. However, when the summed signal is highly erratic, producing a high-level malfunction signal, the particular seismic data recorded during that period may be automatically deleted by the monitor unit.

When one or more individual vibrators are malfunctioning, the recording equipment operator may direct the remaining good vibrators to stay in position and generate additional signals to compensate for the power lost when the faulty vibrator is not operating. As direction of the field recording procedure is primarily the responsibility of the recording equipment operator, he can, with the knowledge of the individual vibrator operation provided by my invention, immediately modify or restructure the data-gathering procedure to compensate for faulty vibrator performance.

Figure 4:
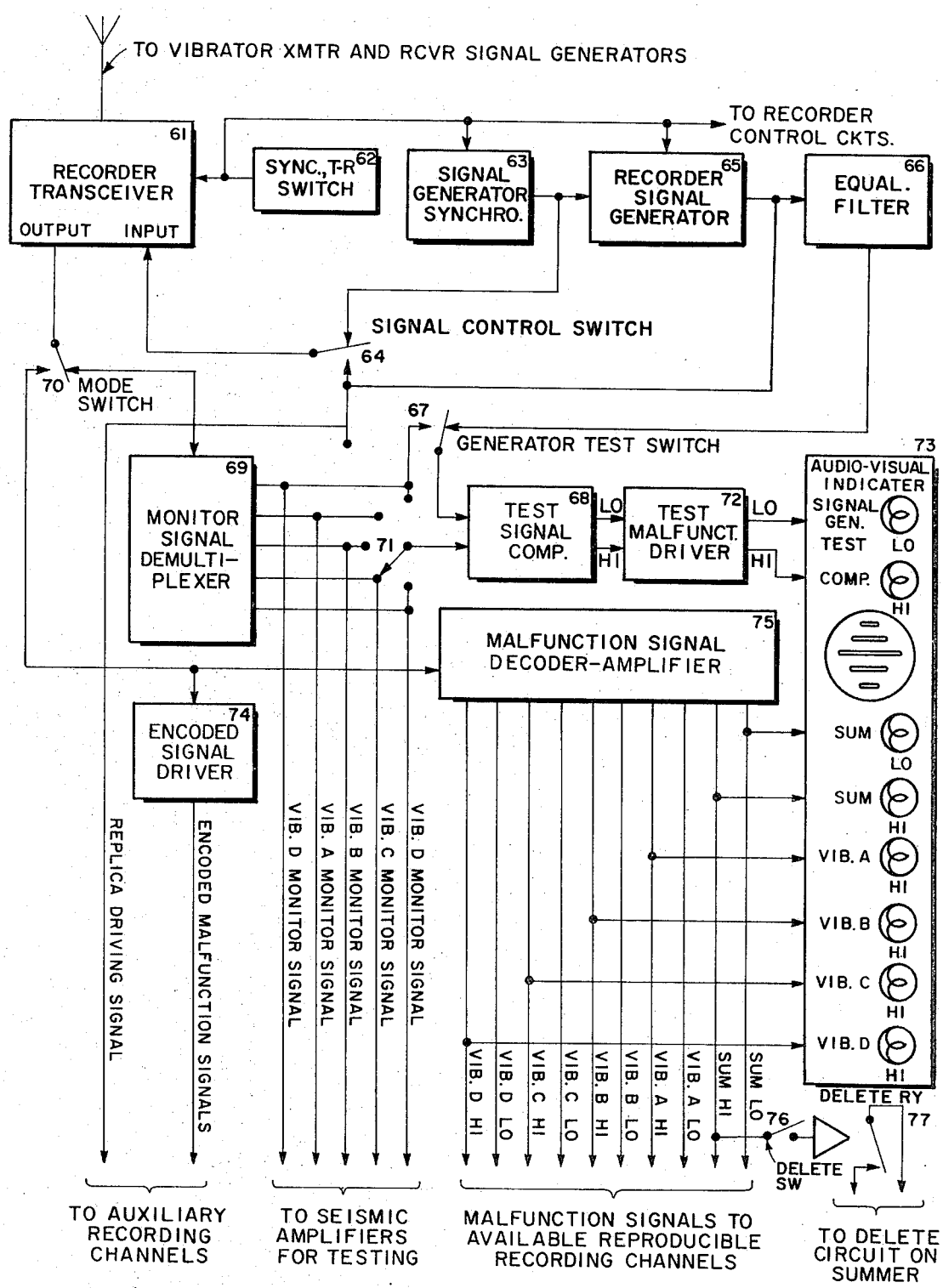
FIG. 4 is a schematic illustration of the recording apparatus monitoring system for subsequent analysis of vibrator performance in conjunction with remote seismic data processing by use of a digital computer.

The third monitor unit, shown in FIG. 4, provides the remote recording equipment operator audio-visual indications of faulty vibrator performance. In addition, in the four vibrator system shown it provides five monitor signals and ten malfunction signals for reproducible recording if desired.

When prepared to record seismic data, the recording equipment operator closes synchronization transmit-receive switch 62, which changes the recorder transceiver 61 from the receiving to the transmit mode, activates the reproducible recorder control circuits, initiates a synchronizing pulse sequence in signal generator synchronizer 63, and starts recorder signal generator 65. Recorder transceiver 61 is a single-frequency, high-powered radio transceiver of the type conventionally used in geophysical operations for verbal communication and data transmission.

When remote signal generators are used to produce drive signals in each vibrator, signal control switch 64 is placed in the upper position, connecting the output of signal generator synchronizer 63 to the input of recorder transceiver 61. The synchronizing pulse train is then transmitted to the remote signal generators (1 in FIG. 2 and 27 in FIG. 3), where it initiates each individual vibrator driving signal. The signal generator synchronizer 63 output is also directed to the recorder signal generator 65 where a replica driving signal is also initiated in synchronization with the remote vibrator driving signals.

Where remote signal generators are not used and the driving signal is supplied to each remote vibrator directly by radio, signal control switch 64 is placed in the lower position, connecting the output of recorder signal generator 65 to the input of recorder transceiver 61. In this arrangement, signal generator synchronizer 63 is not needed and synchronizing transmit receive switch 62 merely initiates the recorder signal generator 65. As discussed above, recorder signal generator 65 may be an independent signal generator circuit or may be a circuit which picks up a predetermined drive signal which has been previously recorded on reproducible magnetic tape.

The recorder signal generator 65 output is reproducibly recorded along with the seismic data signals for subsequent crosscorrelation in a computer data processing center. This recording is made on an auxiliary channel every time seismic data is recorded. The output of recorder signal generator 65 is also passed through equalizing filter 66 and generator test switch 67 to one input of test signal comparator 68. Equalizing filter 66 is a filter similar to the drive filters (10 in FIG. 2 and 40 in FIG. 3) and is used for the same purpose; namely, to compensate for the phase shifts and amplitude distortions in the remote monitor signal filters (7 in FIG. 2 and 33 in FIG. 3). Test switch 67 in the right-hand position shown in FIG. 3 passes local recorder signal generator 65 signal to one input of the comparator, thereby permitting synchronization checks between the local and remote generators. In the other position, test switch 67 passes the demultiplexed load vibrator drive signal from monitor signal demultiplexer 69 to the first input of test signal comparator 68.

After the signal generation sequence has been initiated, synchronization transmit-receive switch 62 is released, changing recorder transceiver 61 over to the receive mode. In one of the monitor applications, the output of recorder transceiver 61 is directed through mode switch 70 to the input of monitor signal demuliplexer 69. Mode switch 70 would be placed in this position for testing at the same time monitor function switch 47, shown in FIG. 3, is placed in the upper monitor signal multiplexer position. When this is done the five signals (i.e., the four vibrator monitor signals and the lead vibrator driving signal) originally multiplexed by monitor signal multiplexer (49 in FIG. 3) appear at the output of monitor signal demultiplexer 69. Any of the four vibrator monitor signals or the lead vibrator driving signal can be fed to the remaining input of test signal comparator 68 by turning selector switch 71. Therefore, the recording equipment operator can compare his local signal generator against the lead vibrator driving signal in the upper position of switch 71 or against any of vibrator A, B, C or D's injected signals in the remaining lower positions of selector switch 71. If the recorder operator suspects a faulty receiver signal generator (1 in FIG. 2) he may direct individual vibrator operator to push his test switch (14 in FIG. 2), thereby causing the low-power transmitter (8 in FIG. 2) to transmit the receiver signal generator output from drive filter 10 in FIG. 2 rather than the monitor signal output from the monitor filter 7 in FIG. 2. By this means, test signal comparator 68 will have the remote and local driving signals available at its two inputs. When generator test switch 67 is in the left-hand position, one input of test signal comparator 68 is connected to the lead vibrator drive signal and when the remote test switch (14 in FIG. 2) is thrown, a comparison can be made between the lead and each of the individual vibrators when the selector switch 71 is in each of the lower four positions. In the upper position of selector switch 71 the same signal is directed to both test signal comparator inputs, permitting a check on comparator performance. Test signal comparator 68 is essentially identical with the first unit signal comparator 9, as seen in FIG. 2, and the comparators 35–39 shown in FIG. 3. The high- and low-level malfunction signals produced when the input signals differ by a predetermined amount, as discussed above, are directed through test malfunction driver 72 where they are amplified to audio-visual indicators 73, where they control the upper two indicator lamps. No audio signal is required for these two malfunction signals because full operator attention is generally insured during this first special monitoring procedure.

The first test procedure where actual signals from vibrator monitors or individual signal generators are transmitted in multiplexed form would generally be used only when vibrator trouble has previously been indicated by the simple malfunction signals. If permanent reproducible recordings are desired for subsequent computer analysis, the outputs from monitor signal demultiplexer 69 may be temporarily connected to some of the seismic recording channels and the actual signals recorded in lieu of seismic data signals. Since seismic data recorder units have a limited number of recording channels, these monitor signal recordings would only be made during a break in the conventional data gathering procedure, when such channels could be used for monitor signal recording without reducing the seismic data signal recording capability. Some modern recorders have extra recording channels which might be used to record these monitor signals along with the seismic data signals. Here, it should be understood that where this monitor signal recording function is not required, the second and third units, shown in FIGS. 3 and 4, the multiplexing and demultiplexing circuits should be eliminated, thereby simplifying the monitor apparatus.

The second type of monitoring provided by my invention involves the use of the malfunction signals only, without the accompanying monitor signals. Malfunction signal monitoring is provided by changing switch 47 in FIG. 3 to the lower position, thereby connecting first and second malfunction encoder 46 to the input of vibrator-transmitter 48 and also changing mode switch 70 in FIG. 4 to the left-hand position, connecting output of recorder-transceiver 61 to encoded signal driver 74 and malfunction signal decoder amplifier 75.

Since only ten malfunction signals are produced in the four vibrator operations used in this example, a very simple encoding-decoding system can be used. The preferred method involves a system using audio frequencies having a pass-band similar to the seismic data signals. Where low frequency (10–100 Hz) codes are used, the encoded signal can be directly recorded on standard seismic data channels with no modification of the recorder circuitry. Encoded signal driver 74 amplifies the encoded malfunction signal which is then directed to one of the auxiliary channels in the existing equipment. This encoded signal, just as with the replica driving signal, is recorded contemporaneously with each seismic data recording for later data processing operations where computer editing procedures can be used to eliminate recordings taken during periods of faulty vibrator operation.

The encoded malfunction signal from recorder-transceiver 61 is also directed to malfunction signal decoder amplifier 75 where it is decoded and amplified to a level where it can operate audio-visual indicator 73. Each of the individual vibrator high-level malfunction signals, as well as the composite sum high- and low-level malfunction signals, are indicated on audio-visual indicator 73.

Each of the ten high- and low-level malfunction signals can also be directed to individual recording channels as desired. This would normally be done only when sufficient recording capacity was available and would therefore be restricted to testing operations where channels were not required for seismic data.

The high-level malfunction signal from the composite sum signal may be used to activate delete relay 77 when delete switch 76 is closed. By closing delete switch 76, the last seismic data recorded on the summing apparatus is automatically erased when a serious malfunction occurs. Less serious malfunction indicated by the remaining high-level individual vibrator malfunction lights or the low-level summed signal light would alert the recorder operator and he can then manually delete the last recording, if necessary.

Figure 5:
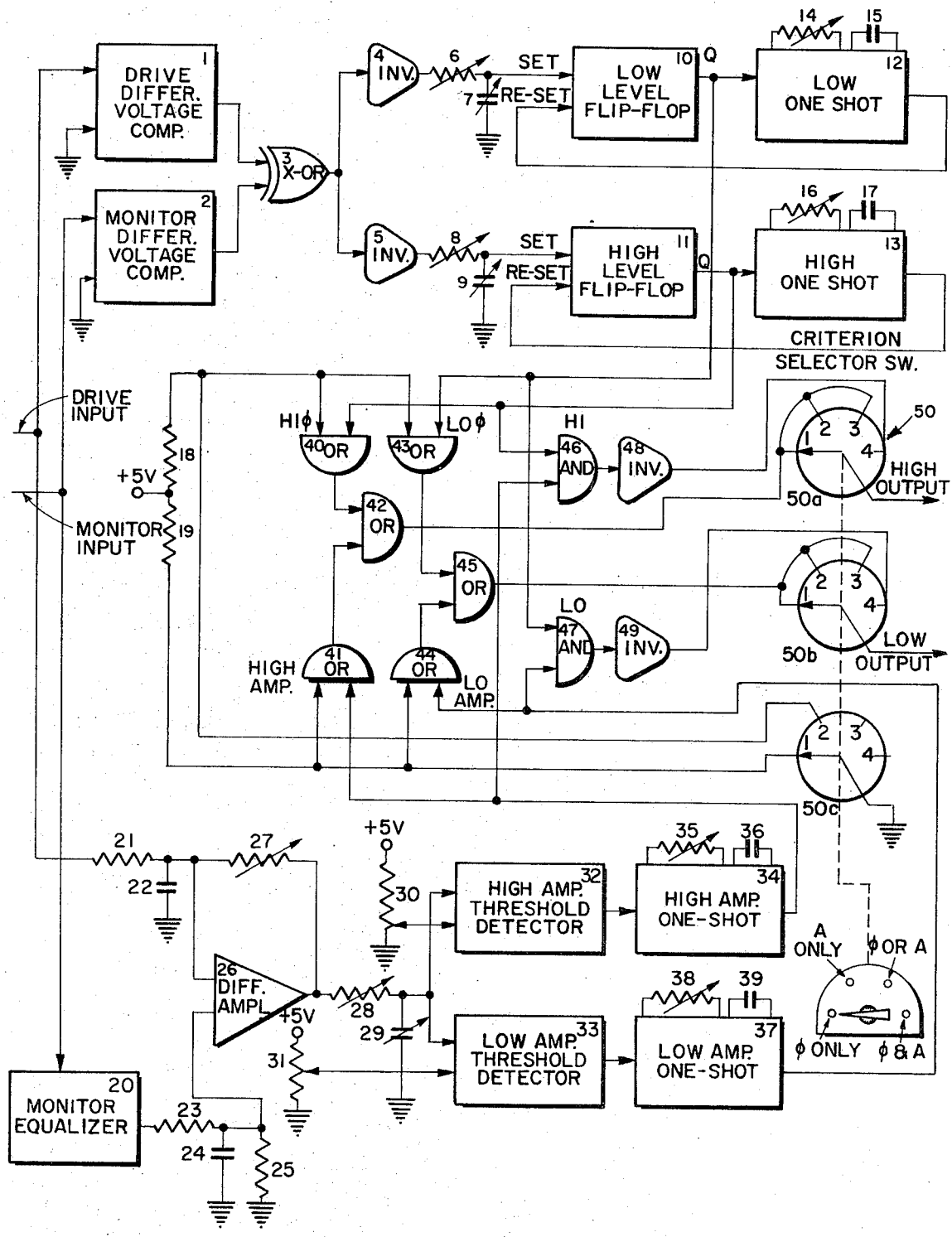
FIG. 5 is a detailed schematic diagram of the two level comparator circuit used in FIGS. 1, 2 and 3 above.

FIG. 5 is a detailed schematic diagram of a suitable signal comparator circuit used in the three monitoring units (9 in FIG. 2, 35–39 in FIG. 3 and 68 in FIG. 4). In normal monitor operation, a drive signal is fed to one input of the comparator and a monitor signal is fed to the other input. During certain tests where separate signal generators are to be compared, drive signals from the different generators may be fed to both inputs.

The monitor circuit shown in FIG. 5 performs two distinct comparison functions, the first involving the relative phase of the two signals and the second involving the amplitude variation between the signals. By properly adjusting a selector switch, a malfunction may be indicated when phase or amplitude, phase and amplitude, phase alone or amplitude alone differs by a predetermined amount.

The phase comparison is performed by the circuitry shown in the upper portion of FIG. 5. The input drive and monitor signals are respectively directed to one of the inputs of drive differential voltage comparator 1 and monitor differential voltage comparator 2. The remaining inputs of these voltage comparators are grounded, causing them to operate as zero crossing detectors. Each voltage comparator produces a square wave signal corresponding to the zero crossing position of the respective input signals. A typical voltage comparator useful in this application is the Signetics Model No. uL710 listed in the Signetics Linear Data Book, Vol. 1, 1972, published by Signetics Corp., 811 East Arques Ave., Sunnyvale, Calif. 94086.

The square wave output signals from the drive and monitor differential voltage comparators 1 and 2 are fed to exclusive Or gate 3 which outputs a series of positive pulses whose width is proportional to the phase difference between the two input signals. Where the two input signals are in-phase, no pulses are produced and, consequently, a constant zero volts will be output from Or gate 3. Where a slight phase difference exists, the pulses will have a very short duration, hence the output will consist of a series of short +5 volt excursions from the zero volt baseline. As the phase difference between the monitor and drive signals increases, the duration of the +5 volt pulses will likewise increase. A typical exclusive Or gate for this function is the Texas Instruments Model SN7486, as described in the Texas Instruments TTL Integrated Circuits Catalogue No. CC201-E, 1969, published by Texas Instruments, Inc., P.O. Box 5012, Dallas, Tex. 75222. Inverters 4 and 5 are used to change this pulse train from a zero volt baseline with +5 volt pulses to a +5 volt baseline with zero volt pulses. A typical inverter for this application is the Texas Instruments Model SN7422, described in the above catalogue. After this inversion process, the resulting signals are integrated by two separate integrators. Integration of the +5 volt signal with zero volt pulses will produce a relatively constant voltage signal having a voltage less than +5 volts depending on the zero volt pulse width. Since the width of the zero volt pulses is proportional to the phase difference, the integrator output voltage will also be proportional to this phase difference.

The first integrator consisting of adjustable resistor 6 and adjustable capacitor 7 is set to produce a nominal +0.8 volt output when a small phase shift exists between the input signals. The second or high-level integrator consisting of adjustable resistor 8 and adjustable capacitor 9 is manually adjusted to produce a +0.8 volt output signal when a much larger phase shift is present between the two input signals. These integrating circuits are respectively connected to the set inputs of low-level flip-flop 10 and high-level flip-flop 11. When from the +5 volt condition a +0.8 volts is reached on the set input, these flip-flops will output a logic 1 which becomes the phase malfunction signals. This logic 1 malfunction signal will remain on the output line until the flip-flop is reset. By experimentally adjusting the values of resistor 6 and capacitor 7 under field operating conditions a first logic 1 or low-level malfunction signal will be produced by low-level flip-flop 10 when a phase distortion of sufficient magnitude to indicate faulty vibrator performance is produced.

A second logic 1 or high-level phase malfunction signal will be output from high-level flip-flop 11 when resistor 8 and capacitor 9 have been adjusted for a much higher level of phase distortion of such magnitude that continued vibrator operation would adversely affect the seismic data quality. A typical flip-flop module for these applications are the Texas Instruments Model SN7422 illustrated in the previous catalogue.

Once the integrated signal drops to the +0.8 volt level, the flip-flop will continue to output a malfunction signal. Since a typical drive signal will last from 7 to 28 seconds, it is of diagnostic value for the vibrator operator to know when during the drive signal period the distortion is occurring. For example, if the distortion was severe at the low frequency portion of the drive signal, the remedial action required may be much different than if it occurred at the high frequency portion of the drive signal. To provide this time variable malfunction information, automatic resetting of the flip-flops is provided by using time variable one-shots with external variable resistors and capacitor networks. The output of low level flip-flop 10 is fed to low one-shot 12, which after a time duration determined by external variable resistor 14 and capacitor 15 will output a pulse which resets flip-flop 10. In like manner, the output of high-level flip-flop 11 feeds high one-shot 13 which after a time interval determined by external variable resistor 16 and capacitor 17 will output a reset pulse to the flip-flop. Time delays of from microseconds up to 40 seconds can be achieved using a one-shot Model SN74121, manufactured by Texas Instruments, as listed in the above catalogue. The high and low level malfunction signal durations are independently variable to permit adjustment for different frequency driving signals and individual operator preferences.

Driving and monitor signal amplitude comparison is performed by the circuitry shown in the lower portion of FIG. 5. The monitor signal input is connected to the input of monitor equalizer 20, which is required to compensate for the standard amplitude distortions introduced by the mechanical vibrator components. Monitor equalizer 20 can be an active or passive filter network construction according to criteria well known to those skilled in the art. Its characteristics are chosen to compensate for the mechanical vibrator transfer characteristics, namely the high and low frequency filtering introduced by correctly operating hydraulic valve accumulators and other components, as well as hydraulic horsepower limits intrinsic to a typical field vibrator. This equalization response curve can be theoretically determined by those skilled in the art of vibrator design or can be experimentally established from tests performed on a vibrator in good operating condition.

The output of monitor equalizer 20 is passed through resistor 23 and capacitor 24 noise filter network to one input of differential amplifier 26. The driving signal input, since no equalization is required, is directed through resistor 21 and capacitor 22 noise filter network to the other input of differential amplifier 26. Resistor 21, 23 and capacitor 22, 24 filter networks are essentially identical and are designed to remove noise spikes at frequencies above the highest driving signal frequency. Differential amplifier 26 has an excellent common mode rejection property and therefore will not amplify signals of equal amplitude at its input terminals. However, when either input signal varies, an output is produced by differential amplifier 26 which after integration by variable resistor 28 and variable capacitor 29 is fed to the first inputs of high amplitude threshold detector 32 and low amplitude threshold detector 33. A typical differential amplifier useful in this application is the Signetics Model LM101A, as illustrated in the above Signetics catalogue.

The gain of differential amplifier 26 is controlled by variable resistor 27 and it is biased by resistor 25. Adjustable integrating resistor 28 and capacitor 29 are set to adjust the time interval over which an amplitude variation must be present to constitute a vibrator malfunction. Although random noise spikes are attenuated by the resistor 21, 23 and capacitor 22, 24 networks, occasional low frequency noise pulses which are not indicative of faulty vibrator performance are attenuated by the variable resistor 28 and variable capacitor 29 integrating network.

The high and low amplitude threshold detectors 32, 33 are essentially the same modules as used for the drive and monitor voltage comparators in the phase portion of the circuit described earlier. Typical units are the same Signetics Model uL710 described in the above catalogue. The threshold levels are independently adjustable by variable resistors 30 and 31. These resistors are configured as voltage dividers between +5 volts and ground. Variable resistor 30 is set to provide a threshold value such that a high amplitude difference between the driving and monitoring signals is required before a logic 1 or high level amplitude malfunction signal is output by high amplitude threshold detector 32. Just as with the phase detector, this high threshold level is selected to be indicative of a severe vibrator malfunction which would seriously impair seismic data quality. Variable resistor 31 is set so that a lower amplitude difference indicative of faulty vibrator operation but not severe enough to impair the seismic data quality will cause low amplitude threshold detector 32 to output a logic 1 low level amplitude malfunction signal. Momentary amplitude variations occurring during the 7 to 28 second duration of the typical drive signal may go undetected by the vibrator operator. For this reason, time variable one-shots are used to extend the high and low level amplitude malfunction signals to a length comparable to the phase malfunction signal described above. The high amplitude threshold detector output 32 is fed to high amplitude one-shot 34, where by means of external variable resistor 35 and capacitor 36 the malfunction signal length can be adjusted to suit individual operator preferences. Likewise, the output from low amplitude threshold detector 33 is directed through low amplitude one-shot 37, where the malfunction signal length can be adjusted by means of external adjustable resistor 38 and capacitor 39. The one-shots 34, 37 used in the amplitude portion of the comparator are similar to those used in the phase portion of the circuit but are connected in a different manner. Typical one-shots useful in this application are the Texas Instruments Model SN74121, described in the above catalogue.

The logic 1 signals output by low level flip-flop 10 and high level flip-flop 11 are respectively the low level phase malfunction signal and the high level phase malfunction signal. The high and low level amplitude malfunction signals are respectively output by high and low amplitude one-shots 34, 37, as discussed above.

High level phase malfunction signals from high level fip-flop 11 are directed to one input of Or gate 40 and to one input of And gate 46. The high level amplitude malfunction signal is fed from high amplitude one-shot 34 to the other input of And gate 46 and to Or gate 41. Only if both high level malfunction signals are present will a signal be output from And gate 46. The remaining inputs to Or gate 40 and Or gate 41 are respectively connected through resistors 18 and 19 to the common +5 volt supply. The outputs of Or gates 40 and 41 are fed to the two inputs of Or gate 42 whose output is directed to contact 1, 2 and 3 of the first deck 50a of criterion selector switch 50. The output of And gate 46 is passed through inverter 48 to contact 4 of criterion selector switch deck 50a. The contact arm of deck 50a is connected to the high level malfunction output terminal of the comparator unit.

The third criterion selector switch deck 50c has a grounded contact arm. Position 1 of this third deck is connected to resistor 19 and the corresponding input of Or gate 41. In like manner, position 2 of criteria selector switch deck 50c is connected to resistor 18 and the corresponding input of Or gate 40. When the selector switch is in the first position, Or gate 41 is disabled, since one terminal is grounded thereby preventing a high level amplitude malfunction signal from high amplitude one-shot 34 from reaching Or gate 42. A high level phase malfunction signal, if present, will pass through Or gate 40 and Or gate 42 to terminal 1 of criteria selector switch deck 50a where it is connected to the high level output line. Consequently, in criterion selector switch position 1, the unit functions as a phase only comparator. In position 2, criterion selector switch deck 50c contact 2 is grounded. This causes Or gate 40 to become disabled and only the high level amplitude malfunction signal is passed through Or gate 51, Or gate 42 and switch selector deck 50a contact 2 to the high level output line. In criterion selector switch position 2, the unit functions as an amplitude only comparator.

In criterion selector switch 50, position 3, neither Or gate 40 nor Or gate 41 is disabled and consequently if a high level phase malfunction signal from high level flip-flop 11 is present or if a high level amplitude only malfunction signal from high amplitude one-shot 34 is present, either will pass through Or gate 42 to selector switch deck 50a, contact 3 and then to the high level output line. Therefore, when criterion selector switch 50 is in position 3, the unit functions as a phase or amplitude comparator where either the phase or the amplitude variations beyond the predetermined limits will produce a malfunction signal.

In criterion selector switch 50, position 4, the high level phase malfunction signal is fed to one input of And gate 46 while the high level amplitude malfunction signal is connected to the other input of And gate 46. The output of And gate 46 is connected through inverter 48 to the fourth terminal of criteria selector switch deck 50a. In the forth selector position, the high level output line is connected through And gate 46 to high level flip-flop 11 and to high amplitude one-shot 34. Consequently, in this forth position the unit operates as a phase and amplitude comparator where both phase and amplitude must be beyond the predetermined limits before a malfunction signal is produced. Inverters 48 and 49 are required to produce malfunction signals having the same polarity as the previous signals which passed through two Or gates.

In a similar manner, the output of low level flip-flop 10 is connected to Or gate 43 and And gate 47. The output of low amplitude one-shot 37 is connected to Or gate 44 and the other input of And gate 47. The other terminals of Or gate 43 and Or gate 44 are respectively connected to resistors 18 and 19. Just as described above, in criterion selector switch 50 position 1 Or gate 44 is disabled, in selector switch position 2, Or gate 43 is disabled, and in selector switch positions 3 and 4, both Or gates are enabled. The output of Or gate 43 and Or gate 44 are fed to Or gate 45 whose output is connected to criteria selector switch deck 50b, positions 1, 2 and 3. The output of And gate 47 is directed through inverter 49 to selector switch deck 50b, fourth position. The contact arm of selector switch deck 50b is connected to the output line for low level malfunction signals.

Or gates 40–45, as well as And gates 46–47, are typically logic gates of the type manufactured by Texas Instruments as Model SN7400. Inverters 48 and 49 are Texas Instruments Model SN7404 or equivalents. Both of the above units are described in the Texas Instruments TTL Integrated Circuits Catalogue referenced above. Criterion selector switch 50 is a conventional three pole rotary switch with at least four positions. A typical switch for this application is the Greyhill Series 9 rotary switch as shown in Engineering Catalogue G—308, published in 1972 by Greyhill, Incorporated, P.O. Box 373, LaGrange, Ill. 60525.

The low level malfunction signal criteria are determined by the criterion selector switch 50 positions in the same manner as the high level signals discussed above. In selector switch position 1, a low level malfunction signal is produced only when a phase difference is present between the monitor and driving signals of an amount exceeding the predetermined value established by adjusting resistor 6 and capacitor 7. In this first position, amplitude variations between the signals had no effect. In the second position of criterion selector switch 50, only amplitude variations between the monitor and drive signals which exceed the predetermined values set by adjusting variable resistors 27 and 31 will produce a low-level malfunction signal. When criterion selector switch 50 is in the third position, either phase or amplitude variations exceeding the predetermined values will produce a low-level malfunction signal. In the forth position of criterion selector switch 50, both amplitude and phase variations of an amount exceeding the predetermined values are required before a low-level malfunction signal is output from the comparator unit.

The choice of which criterion best indicates faulty vibrator performance must be made on site as a result of tests taken before routine seismic data gathering begins. Different mechanical designs of various vibrators and characteristics of the near surface soil material upon which the vibrators operate are both important factors in choosing the malfunction signal criterion as well as in setting the high- and low-level malfunction thresholds.

The filters, amplifiers, summers, multiplexers, demultiplexers, radio transmitters, and receivers used in my first, second, and third monitor units are of conventional design, familiar to those skilled in the art. These are generally commercially available as separate units or in modular form. The individual vibrator signal generators and associated signal generator synchronizer units are described in U.S. Pat. No. 3,733,534 by Pelton and Mitchell.

While my invention has been described in terms of a specific preferred embodiment, it will be clear that based on the principles outlined, one skilled in the art can devise other embodiments and modifications which do not depart from the broadest aspects of the invention.

I claim:

1. In a seismic prospecting system utilizing at least one individual earth vibrator for generating seismic signals at a pattern of separated locations on the surface of the earth in accordance with a predetermined electrical driving signal, the method of monitoring individual vibrator operation comprising the steps of:
   a. producing a monitor electrical signal corresponding to each said seismic signal injected into the earth by said individual vibrator at each vibrator location;
   b. amplifying each said monitor electrical signal such that its amplitude approximately equals the amplitude of said predetermined electrical driving signal;
   c. comparing each said amplified monitor and said predetermined electrical driving signal such that a first malfunction signal is produced when said signals differ in a first predetermined amount indicative of faulty vibrator operation; and
   d. actuating a first indicator at said individual vibrator by said first malfunction signal, whereby the operator of said individual vibrator can be altered to the fact that his equipment is not operating correctly and should be adjusted.

2. A method as recited in claim 1 where said monitor signal producing step is accomplished by generating said monitor electrical signal with an elastic wave transducer placed at least near the base plate of said individual vibrator.

3. A vibrator monitoring method as recited in claim 1 where said comparing step is accomplished by use of a phase comparator circuit such that said first malfunction signal is produced when the phase difference between said monitor and driving signals exceeds a predetermined value chosen to be indicative of faulty vibrator performance.

4. A vibrator monitoring method as recited in claim 1 where said comparing step is accomplished with an amplitude comparator circuit such that a change in amplitude ratio between said monitor and driving signals which as a function of frequency exceeds a predetermined value produces said first malfunction signal.

5. A method of vibrator monitoring as recited in claim 1 further comprising the steps of:
   a. filtering said monitor signal using a first band-pass filter to attenuate harmonics and noise generated by said individual vibrator during the injection process; and
   b. filtering said predetermined electrical drive signal with a second band-pass filter having essentially identical amplitude and phase response characteristics with said first band-pass filter for the purpose of introducing phase and amplitude distortions essentially equal to those introduced by said filtering step (a) above.

6. A vibrator monitoring method as recited in claim 1 further comprising the steps of:
   a. comparing said monitor and electrical driving signals such that a second malfunction signal is produced when said signals differ in a second predetermined manner indicative of more severe vibrator malfunction than said faulty operation indicated by said first malfunction signal; and
   b. actuating a second indicator within said individual vibrator vehicle by said second malfunction signal, whereby the operator of said individual vibrator can be altered that his equipment is seriously malfunctioning and should not be used further until repaired.

7. A method of vibrator operation monitoring as recited in claim 6 further comprising the step of automatically stopping said individual vibrator when said second malfunction comparison step produces said second malfunction signal indicating that said monitor and drive signals differ by said second predetermined amount.

8. In a seismic prospecting system having a plurality of individual earth vibrators for simultaneously injecting a sequence of seismic signals at separated locations on the earth's surface in synchronism with a predetermined electrical drive signal, a remove seismic data amplifying and reproducible recording apparatus for amplifying and reproducibly recording the seismic data signals resulting from said seismic signal injection process, the method of monitoring said seismic signals injected into the earth by each of said individual vibrators during each cycle of said sequence comprising the steps of:
   a. at each of said individual vibrator locations producing a monitor electrical signal corresponding to said individual seismic signal injected into the earth by said individual vibrator;
   b. amplifying each of said monitor electrical signals such that its amplitude approximately equals the level of said predetermined electrical driving signal;
   c. filtering each said amplified electrical monitor signal to attenuate harmonics and other vibrator associated noise;
   d. transmitting said filtered monitor signals from each of said individual vibrators to a central control location;
   e. at said central control location producing a replica of said predetermined electrical drive signal;
   f. filtering said replica predetermined drive signal with a filter essentially identical to that used in step (c) above for the purpose of introducing essentially equal phase and amplitude response changes;

g. first comparing each of said individual monitor signals with said replica predetermined electrical drive signal such that a third and fourth electrical malfunction signal is produced when any of said individual monitor signals correspondingly differ from said replica drive signal by a third and fourth predetermined amount, said third predetermined amount being chosen to indicate faulty vibrator operation of a single vibrator of such degree as to require remedial vibrator repairs and said fourth predetermined amount being chosen to indicate serious seismic data quality degradation requiring shut down of said vibrator;

h. electronically summing said individual monitor signals to produce a composite monitor signal corresponding to the total seismic signal simultaneously injected from all of said individual vibrators during any one injection cycle;

i. comparing said composite monitor signal with said predetermined electrical drive signal to produce fifth and sixth electrical malfunction signals when said composite monitor and replica drive signals correspondingly differ by a fifth and sixth predetermined amount, said fifth predetermined amount being chosen to indicate moderate composite injected signal distortion such that the signal injection cycle sequence may be extended using the remaining good vibrators to improve seismic data quality; and said sixth predetermined amount being chosen to indicate severe composite injected signal distortion such that a repeated injection cycle sequence is required; and j. indicating by means of a plurality of audio-visual signals to an operator at said central control location when said fourth, fifth and sixth malfunction signals are present, thereby alerting him to faulty vibrator operation so that remedial action can be taken by directing a faulty vibrator to shut down when said fourth malfunction signal is actuated, extension of said injection cycle sequence with the remaining good vibrators when said fifth malfunction signal is present and repeating the entire injection cycle sequence when said sixth malfunction signal is present before the individual vibrators have been moved from their respective injection locations.

9. The method as recited in claim 8 further comprising the steps of:

a. encoding said third, fourth, fifth and sixth malfunction signals produced by said individual vibrator and said composite signal comparing steps in a form such that the encoded signal frequencies fall within the bandwidth of said remote seismic data amplifying and reproducible recording apparatus;

b. transmitting said encoded malfunction signal from said central control location to said remote seismic data amplifying and recording apparatus location;

c. decoding said encoded malfunction signal to reproduce said third, fourth, fifth and sixth malfunction signals in their original form at said remote amplifying and recording apparatus location;

d. indicating to a recorder operator by means of audio visual signals when said fourth, fifth and sixth malfunction signals are present such that said recorder operator can delete seismic data signals recorded during a faulty vibrator injection cycle.

10. The method as recited in claim 9 further comprising the step of reproducibly recording said encoded malfunction signal on an auxiliary seismic data channel in said amplifying and reproducible recording apparatus for the purpose of subsequent decoding at a remote data processing center to recover said third, fourth, fifth and sixth malfunction signals thereby permitting subsequent data editing where vibrator failures have occurred.

11. The method as recited in claim 9 further comprising the step of reproducibly recording said third, fourth, fifth and sixth decoded malfunction signals on separate individual recording channels for the purpose of subsequent identification and analysis of faulty vibrator performance.

12. The method as recited in claim 9 further comprising the step of automatically stopping the summation of received seismic signals in said amplifying and reproducibly recording apparatus when said sixth malfunction signal is present.

13. An improved seismic prospecting method where a plurality of earth vibrators simultaneously inject a sequence of essentially identical seismic signals into the earth at a first series of separated vibrator locations on the earth's surface, a plurality of seismometers located at a second series of separated seismometer locations produce electrical seismometer signals corresponding to said seismic signal at each seismometer location after reflection and refraction by said surface acoustical interfaces, at a remote multichannel recording apparatus location separately amplifying each seismometer signal, summing the corresponding seismometer signals produced during each cycle of the injection sequence and reproducibly recording the separate final sum signals when each injection sequence is complete, wherein the improvement comprises:

a. at each separated vibrator location producing a predetermined vibrator drive signal for the purpose of controlling said vibrator, said drive signal being essentially synchronized with all other drive signals produced by other vibrator locations;

b. at each separated vibrator location producing a monitor electrical signal corresponding to the seismic signal actually injected into the earth by said earth vibrator;

c. at said remote recording apparatus location producing a replica of said predetermined vibrator drive signals essentially in synchronism with said predetermined drive signals produced at each of said earth vibrator locations;

d. amplifying said monitor signal at each separated vibrator location until its amplitude essentially equals that of said predetermined drive signal;

e. filtering said monitor signal to attenuate harmonics and other vibrator noises;

f. transmitting each of said filtered monitor signals separately from each of said plurality of earth vibrator locations to a central control location;

g. multiplexing said plurality of earth vibrator monitor signals at said central location to form a single multiplexed monitor signal;

h. retransmitting said single multiplexed monitor signal from said central control location to said remote multichannel recording apparatus location;

i. at said remote recording apparatus location demultiplexing said multiplexed monitor signal to produce separate monitor electrical signals corresponding to each of said original plurality of seismic vibrator signals;

j. filtering said replica of said predetermined vibrator drive signals produced at said remote recording apparatus in step (c) above where said filter is essentially identical to said filters used in step (e) above to eliminate harmonics and other noises on the individual vibrator monitor signals, said filtering being for the purpose of introducing essentially identical phase and amplitude distortions on the monitor and driving signals;

k. comparing said filtered replica drive signal with each of said demultiplexed electrical monitor signals to produce a seventh malfunction signal when any of said monitor signals differ from said predetermined replica drive signal by a seventh predetermined amount chosen to indicate faulty vibrator operation which may impair seismic data quality;

l. comparing said filter replica drive signal with each of said demultiplexed electrical monitor signals to produce an eighth malfunction signal when any of said monitor signals differ from said predetermined replica drive signal by an eighth predetermined amount chosen to indicate a more severe vibrator malfunction than in step (k) above such that a severe degradation in the seismic data quality wll occur;

m. indicating to said recorder operator by means of a seventh audio-visual indicator when said seventh malfunction signal is produced in comparison step (k) above; and n. indicating to said recorder operator by means of an eighth audiovisual indicator when said eighth malfunction signal is produced by said comparison step (l) above.

14. A method as recited in claim 13 further comprising the step of reproducibly recording said demultiplexed electrical monitor signals and said replica predetermined drive signal on auxiliary channels of said reproducible recording apparatus for subsequent analysis in conjunction with said reproducibly recorded seismic data signals.

15. In a seismic prospecting system of the type having a plurality of earth vibrators which simultaneously inject vibratory seismic signals into the earth, a means within each of said earth vibrators for producing a predetermined electrical driving signal, a vibrator control means within each individual earth vibrator for actuating said individual vibrator in response to said predetermined electrical driving signal such that such injected vibratory seismic signal approximately coincides with said predetermined electrical signal, an individual vibrator performance monitoring apparatus comprising:

a. means for producing a monitor electrical signal corresponding to said vibratory signal injected into the earth by each of said plurality of vibrators at its respective operating location;

b. means for amplifying said monitor electrical signal such that its level essentially equals that of said predetermined electrical driving signal produced within each of said plurality of vibrators;

c. means for filtering said amplified monitor electrical signal to remove harmonics and noise;

d. means for filtering said predetermined electrical driving signal in an essentially identical manner as accomplished by said monitor signal filtering means in step (c) above, for the purpose of introducing equal phase shifts and amplitude variations in said monitor and driving signals;

e. means for comparing said filtered predetermined electrical driving signal and said filtered electrical monitor signal so as to produce first and second malfunction signals when said driving and monitoring signals differ respectively by a first predetermined amount and a second predetermined amount, said first predetermined amount being chosen to indicate faulty vibrator operation of a degree which requires remedial action by said vibrator operator but not complete shutdown and said second predetermined amount being established to indicate severe vibrator malfunction which would degrade seismic data produced by its continued operation; and f. means within each of said plurality of vibrators for producing both visual and oral indications of said first and second malfunction signals to alert an operator of said individual earth vibrator that his equipment is malfunctioning.

16. A vibrator performance monitoring apparatus as recited in claim 15 where said comparing means comprises:

a. means for measuring the phase shift between said monitor and driving signals;

b. means for producing a low level phase malfunction signal when said phase shift measured by said phase measuring means exceess a first predetermined phase difference;

c. means for producing a high level phase malfunction signal when said phase shift measured by said phase measuring means exceeds a second predetermined phase difference beyond said first predetermined phase difference;

d. means for measuring an amplitude difference between said monitor and driving signals;

e. means for producing a low-level amplitude malfunction signal when said amplitude difference measured by said amplitude measuring means exceeds a first predetermined amplitude difference threshold;

f. means for producing a high-level amplitude malfunction signal when said amplitude difference measured by said amplitude measuring means exceeds a second predetermined amplitude difference threshold beyond said first predetermined amplitude threshold;

g. a first four position, low-level switching means connected between a first malfunction signal output terminal, said low-level phase malfunction signal producing means and said low level amplitude malfunction signal producing means where said first malfunction signal is produced at said first output terminal by said low-level phase malfunction signal alone in the first position, by said low-level amplitude malfunction signal alone in the second position, by either said low-level phase or low-level amplitude malfunction signals in the third position, and by both the low-level phase and low-level amplitude malfunction signals in the fourth position; and h. a second four position, high-level switching means connected between a second malfunction signal output terminal, said high-level phase malfunction signal producing means, and said high-level amplitude malfunction signal producing means, where said second malfunction signal is produced at said second output terminal by said high-level phase malfunction signal alone in the first switch position by said high-level amplitude malfunction signal alone in the second switch position by either said high-level phase malfunction signal or high-level amplitude malfunction signal in the third position and by both high-level phase and high-level amplitude malfunction signals in the fourth switch position.

17. A vibrator performance monitoring apparatus as recited in claim 15 further comprising:
    a. transmission means located within each of said plurality of earth vibrators switchably connected to said monitor electrical signal filtering means for the purpose of transmitting said individual earth vibrator monitor signals to a central control location for comparison with other signals from other individual vibrators;
    b. reception means connected to said transmission means located at a central control location for separately reproducing said monitor signals from each of said plurality of earth vibrators;
    c. means for producing a first replica of said predetermined electrical driving signal at said central control location;
    d. means for filtering said replica driving signal in essentially an identical manner as accomplished by said monitor and driving signal filtering means performed at each of said plurality of earth vibrator locations for the purpose of introducing phase shift and amplitude variations essentially equal to those introduced by said filtering means located at each earth vibrator location;
    e. summing means connected to said reception means for compositing monitor signals received at said central control location from each of said plurality of earth vibrators, thereby producing a summed monitor signal representative of the composite seismic signal injected into the earth by all of said plurality of earth vibrators operating simultaneously;
    f. a plurality of control location comparing means each for comparing said filtered replica predetermined electrical driving signal with each of said monitor signals received at said central control location by said reception means and with said summed monitor signal produced by said summing means, producing a third and fourth malfunction signal when said replica driving signal and corresponding individual monitor signals differ respectively by a third and fourth predetermined amount, said third predetermined amount being chosen to indicate faulty vibrator operation of a degree which requires remedial action but not so severe as to require repeating the seismic signal injection procedure and said fourth predetermined amount being chosen to indicate severe vibrator malfunction of a degree which requires repetition of the seismic injection procedure after vibrator repairs have been effected; and
    g. a plurality of audio-visual indicating means each connected on one of said comparing means for the purpose of providing a visual and audible indication of said third and fourth malfunction signals to personnel at said central control location so that remedial action to repair faulty vibrators can be taken and seismic signal injection cycles repeated where required.

18. A vibrator performance monitoring apparatus as recited in claim 17 further comprising:
    a. a signal encoder connected to each of said plurality of comparing means for encoding said third and fourth malfunction signals from each comparing means into a single encoded signal having a band width commensorate with a bandwith recording capability of a seismic recording apparatus;
    b. transmission means switchably connected to said encoding means for transmitting said encoded signal to a remote recording apparatus location;
    c. reception means connected to said transmission means for reproducing signals from said transmission means at a remote recording apparatus location;
    d. decoding means connected to said remote recorder reception means for decoding said encoded signal thereby reproducing said third and fourth malfunction signals from each of said comparing means at said remote recorder;
    e. a plurality of audio-visual indicator means located at said remote recorder location connected to said decoding means to visually and audibly alert said recorder equipment operator when said third and fourth malfunction signals are present, thereby permitting him to delete a seismic data recording taken during a faulty vibrator injection cycle and to repeat an injection cycle where necessary;
    f. an automatic switch means connected between said decoding means and a seismic data signal summing means such that when a fourth malfunction signal is produced by said composite signal comparison means seismic data summed during a faulty vibrator injection cycle will be automatically deleted from previous seismic data summed before said faulty vibrator injection cycle; and
    g. an encoded signal recording means connected between said reception means and said seismic recording apparatus for amplifying and reproducibly recording said encoded signal in conjunction with seismic data signals produced by said plurality of earth vibrators.

19. A vibrator performance monitor apparatus as recited in claim 17 further comprising:
    a. signal multiplexing means connected to said reception means and to said replica driving signal producing means at said central location for the purpose of multiplexing said individual vibrator monitor signals and said replica driving signal, said signal multiplexing means being connected to said transmission means through a switch which when in the multiplex position will cause said transmission means to transmit said multiplex signal in lieu of said encoded signal;
    b. a demultiplexing means located at said recording apparatus switchably connected to said receiver means such that said multiplex signal received from said central control location is demultiplexed thereby reproducing the original monitor signals from each of said plurality of vibrators and said central control location replica driving signal;

c. a recorder signal generator located at said recording apparatus for producing a second replica of said predetermined electrical vibrator driving signal;

d. means for filtering said second replica driving signal in an essentially identical manner as accomplished by said driving signal filtering means at said central control location and at each individual vibrator location for the purpose of introducing equivalent phase shifts and amplitude variations at said recording apparatus location;

e. comparing means switchably connected to said second replica driving signal filtering means and to said demultiplexing means for producing a fifth and sixth malfunction signal when said second replica driving signal respectively differs from a switch selected monitor signal output from said demultiplexer means by a fifth and sixth predetermined amount, said fifth predetermined amount being chosen to indicate faulty vibrator performance of a degree requiring shutdown of that particular vibrator and further injection cycles on the part of the remaining good vibrators and said sixth predetermined amount being chosen to indicate such severe vibrator malfunctions that the entire injection procedure by all vibrators must be terminated until repairs have been effected; and f. audio-visual indicating means connected to said replica signal comparing means for indicating the presence of said fifth and sixth malfunction signals to said recording equipment operator to permit him to make appropriate adjustments in the field operating procedure to correct for vibrator malfunctions.

20. A vibrator monitoring apparatus as recited in claim 19 further comprising switching means at each individual vibrator for connecting said individual vibrator transmission means to said individual vibrator predetermined electrical driving signal producing means, thereby permitting said recording equipment operator to check synchronization between each of said driving signal producing means located in each individual vibrator, said central control location, and said recording equipment location.

* * * * *

PO-1050
(5/69)

UNITED STATES PATENT OFFICE
CERTIFICATE OF CORRECTION

Patent No. 3,858,170     Dated December 31, 1974

Inventor(s) Francis R. Freeman; Joseph F. Metrailer

It is certified that error appears in the above-identified patent and that said Letters Patent are hereby corrected as shown below:

Column 1, line 63, "now" should read "not".

Column 8, line 43, "25,25, and 26" should read "24,25 and 26".

Column 12, line 8, "demultiplexed load" should read "demultiplexed lead".

Column 17, line 53, "51" should read "41".

Column 19, line 49, "altered" should read "alerted".

Column 20, line 28, "altered" should read "alerted"; line 42, "remove" should read "remote".

Column 24, line 34, "exceess" should read "exceeds".

Column 26, line 2, "on one" should read "to one".

Signed and sealed this 4th day of March 1975.

(SEAL)
Attest:

RUTH C. MASON
Attesting Officer

C. MARSHALL DANN
Commissioner of Patents
and Trademarks